(12) United States Patent
Clarkson et al.

(10) Patent No.: US 7,681,950 B2
(45) Date of Patent: Mar. 23, 2010

(54) FLIP-UP SEAT WITH REAR SEAT STORAGE

(75) Inventors: Douglas D. Clarkson, Colgate, WI (US);
Francis Giunta, Hartford, WI (US);
John B. Zapushek, Racine, WI (US);
Thomas Mandery, Waukesha, WI (US);
Brendon Smith, Milwaukee, WI (US);
David Rank, Menomonee Falls, WI (US)

(73) Assignee: Harley-Davidson Motor Company Group, LLC, Milwaukee, WI (US)

( * ) Notice: Subject to any disclaimer, the term of this patent is extended or adjusted under 35 U.S.C. 154(b) by 214 days.

(21) Appl. No.: 11/771,813

(22) Filed: Jun. 29, 2007

(65) Prior Publication Data
US 2009/0001780 A1    Jan. 1, 2009

(51) Int. Cl.
B60N 2/30        (2006.01)
(52) U.S. Cl. .................... 297/236; 297/195.12; 180/219
(58) Field of Classification Search ................ 297/236, 297/195.12, 195.13; 180/219
See application file for complete search history.

(56) References Cited

U.S. PATENT DOCUMENTS

| | | | | |
|---|---|---|---|---|
| 268,519 | A * | 12/1882 | Moore | 297/235 |
| 415,971 | A * | 11/1889 | Kerr | 297/235 |
| 500,354 | A * | 6/1893 | Sparks | 297/236 |
| 1,320,854 | A * | 11/1919 | Hammers | 297/236 |
| 2,320,210 | A * | 5/1943 | Bender | 297/203 |
| 3,549,172 | A * | 12/1970 | McBroom et al. | 280/202 |
| 3,913,974 | A * | 10/1975 | Bowen | 297/195.12 |
| 4,563,038 | A * | 1/1986 | Hirose | 297/243 |
| 4,679,647 | A * | 7/1987 | Komuro | 180/219 |
| 4,953,911 | A * | 9/1990 | Hanagan | 297/215.12 |
| 5,172,788 | A * | 12/1992 | Fujii et al. | 180/219 |
| 5,322,345 | A | 6/1994 | Desser et al. | |
| 5,533,783 | A | 7/1996 | Harms et al. | |
| 5,553,915 | A | 9/1996 | Stamatakis | |
| 5,558,260 | A | 9/1996 | Reichert | |
| 5,713,629 | A * | 2/1998 | Plackis | 297/236 |
| 5,740,989 | A * | 4/1998 | Daines | 244/118.6 |
| 6,481,792 | B1 | 11/2002 | Goin | |

(Continued)

FOREIGN PATENT DOCUMENTS

DE    2641586    3/1978

(Continued)

*Primary Examiner*—Kevin Hurley
(74) *Attorney, Agent, or Firm*—Michael Best & Friedrich LLP

(57) ABSTRACT

A seat assembly for a motorcycle includes a rider seat having a forward end and a rearward end, a mounting bracket pivotally coupling the forward end of the rider seat to a frame of a motorcycle, the rider seat being pivotable to raise the rearward end of the seat, and a support arm. The seat assembly further includes a rear seat support having a first end portion and a second end portion, the first end portion being pivotally coupled to the support arm and the second end portion supporting a rear seat. The rear seat support is pivotal from a first position in which the rear seat is hidden from view below the rider seat to a second position in which the rear seat can support a passenger. The seat assembly also includes a stop feature for supporting the second end portion relative to the support arm and a lock feature for inhibiting pivoting of the rear seat support.

18 Claims, 13 Drawing Sheets

U.S. PATENT DOCUMENTS 6,648,408 B1 11/2003 Grove
7,021,708 B2 4/2006 Renner
7,111,903 B1 9/2006 Snelson
2006/0125298 A1 6/2006 Milton, III

FOREIGN PATENT DOCUMENTS

IT 504541 12/1954
JP 63986 3/1990

* cited by examiner

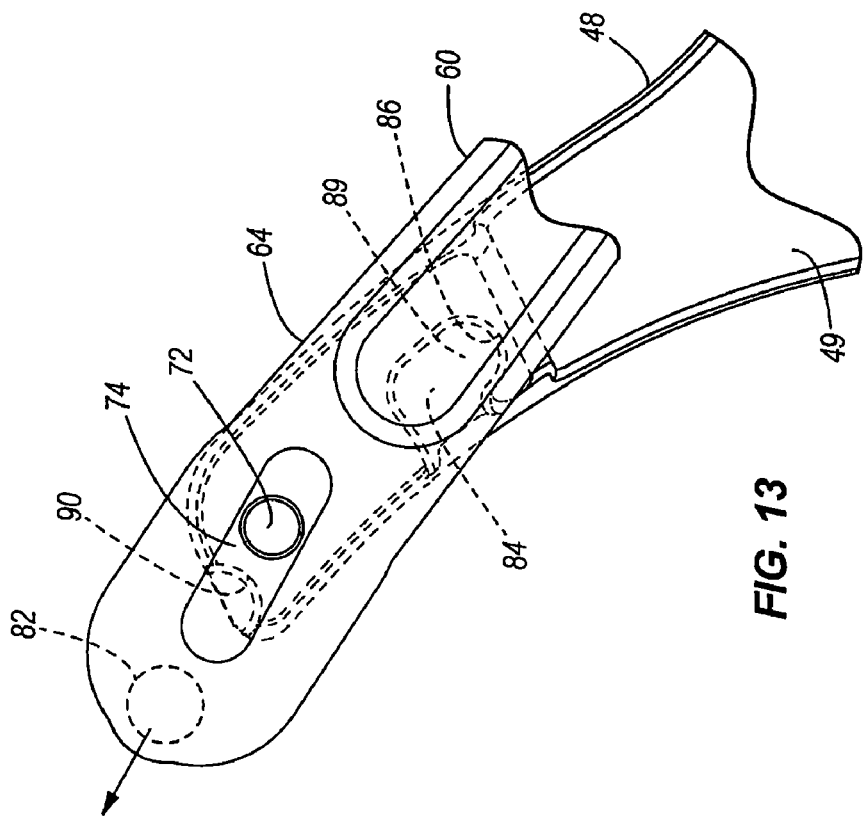
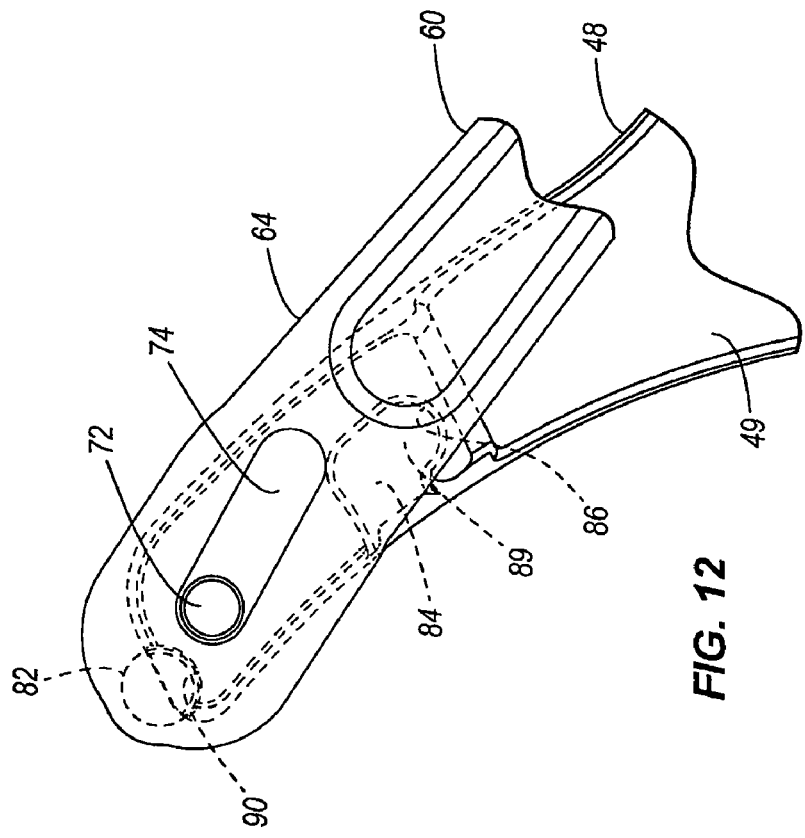
FIG. 13
FIG. 12 ly of FIG. 6.

FLIP-UP SEAT WITH REAR SEAT STORAGE

FIELD OF THE INVENTION

The present invention relates to a seating assembly for a motorcycle.

BACKGROUND

Motorcycles are provided with various types of seats for the comfort of motorcycle operators and passengers. Motorcycle seats can be coupled to the motorcycle in a variety of ways, including hinging the seat to the motorcycle frame, or bolting the motorcycle seat to the frame. Some motorcycles are provided with a single seat for conveying a single rider. Other motorcycles are provided with a forwardly-oriented rider seat and a rearwardly-oriented passenger seat for conveying two riders at the same time.

SUMMARY

In one embodiment, the invention provides a seat assembly for a motorcycle. The seat assembly includes a rider seat, a support arm located rearward of the rider seat and a rear seat support having a first end portion and a second end portion. The first end portion is pivotally coupled to the support arm and the second end portion supports a rear seat. The rear seat support is movable from a first position, in which the rear seat is stowed below the rider seat, to a second position in which the rear seat is located rearward of the rider seat for supporting a passenger.

In another embodiment, the invention provides a rear seat assembly for a motorcycle. The rear seat assembly includes a pair of spaced apart rear seat supports each having a first end portion and a second end portion. The first end portion is movably couplable to the motorcycle. A cross-support joins the second end portions and a rear seat is mounted to the cross support. The rear seat also includes a lock feature on the rear seat supports for inhibiting pivoting of the rear seat.

In another embodiment, the invention provides a method of configuring a motorcycle for supporting a second rider. The method includes concealing a rear seat below a rider seat. The method further includes moving the rear seat relative to the motorcycle, thereby moving a first end portion of the rear seat from a stowed position below the rider seat to a usage position rearward of the rider seat. The method includes engaging a stop protrusion on one of the rear seat and a frame of the motorcycle with a stop recess on the other of the recess and the frame to support the rear seat in the usage position.

Other aspects of the invention will become apparent by consideration of the detailed description and accompanying drawings.

BRIEF DESCRIPTION OF THE DRAWINGS

FIG. 12 is a side view of the rear seat support of FIG. 6 in the stowed position.

FIG. 13 is a side view of the rear seat support of FIG. 12. slid upwardly.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Figure 1:
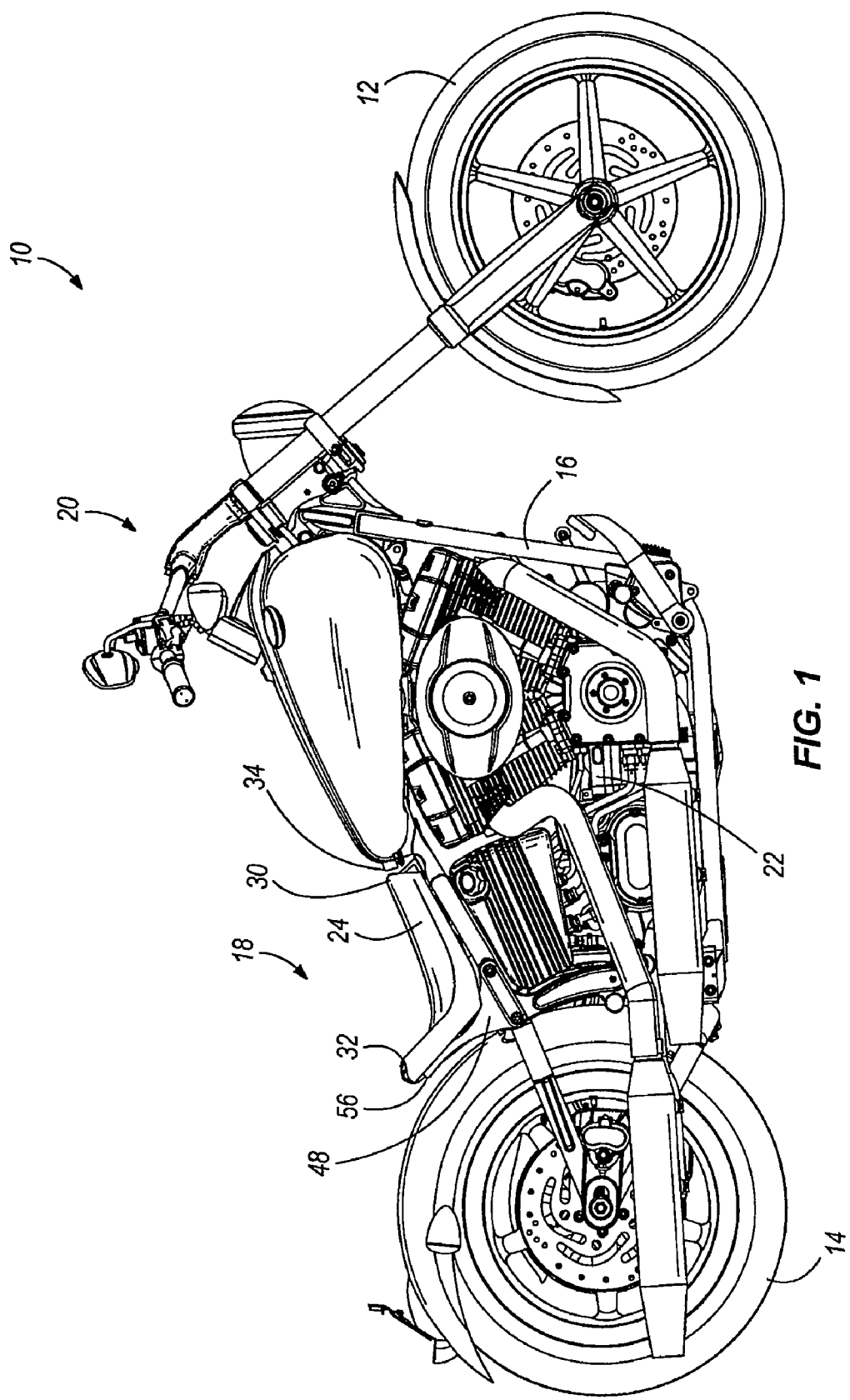
FIG. 1 is a side view of a motorcycle in a single rider configuration according to an embodiment of the invention.

FIG. 1 illustrates a motorcycle 10 according to an embodiment of the invention. The motorcycle 10 includes a front wheel 12 and a rear wheel 14 supporting a frame 16 for movement over the ground, a seating assembly 18 supported on the frame 16, and a handlebar assembly 20 operably coupled to the front wheel 12 for controlling steering of the motorcycle 10. The motorcycle 10 further includes an engine 22 for driving movement of the rear wheel 14.

Figure 2:
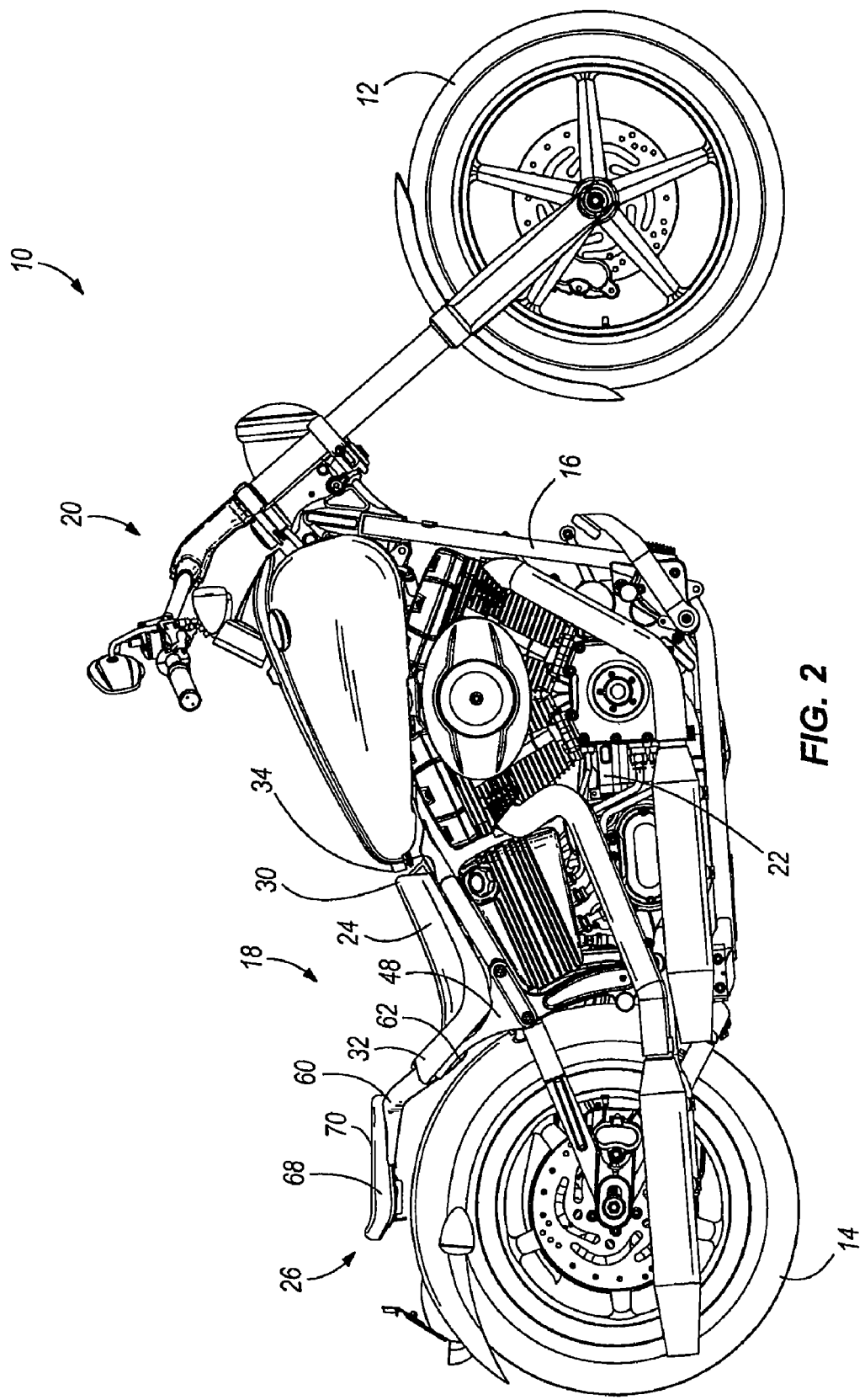
FIG. 2 is a side view of the motorcycle of FIG. 1 in a dual rider configuration.

The seating assembly 18 includes a rider seat 24 and a rear or pillion seat assembly 26 for supporting a secondary rider or passenger behind the rider in the rider seat 24. The rear seat assembly 26 is movable from a first or stowed position as illustrated in FIG. 1 (rear seat assembly 26 not visible) to a second or usage position as illustrated in FIG. 2. When the rear seat assembly 26 is in the stowed position as shown in FIG. 1, the motorcycle 10 is configured for supporting a single rider. When the rear seat assembly 26 is in the usage position as shown in FIG. 2, the motorcycle 10 is configured for supporting two riders.

Figure 3:
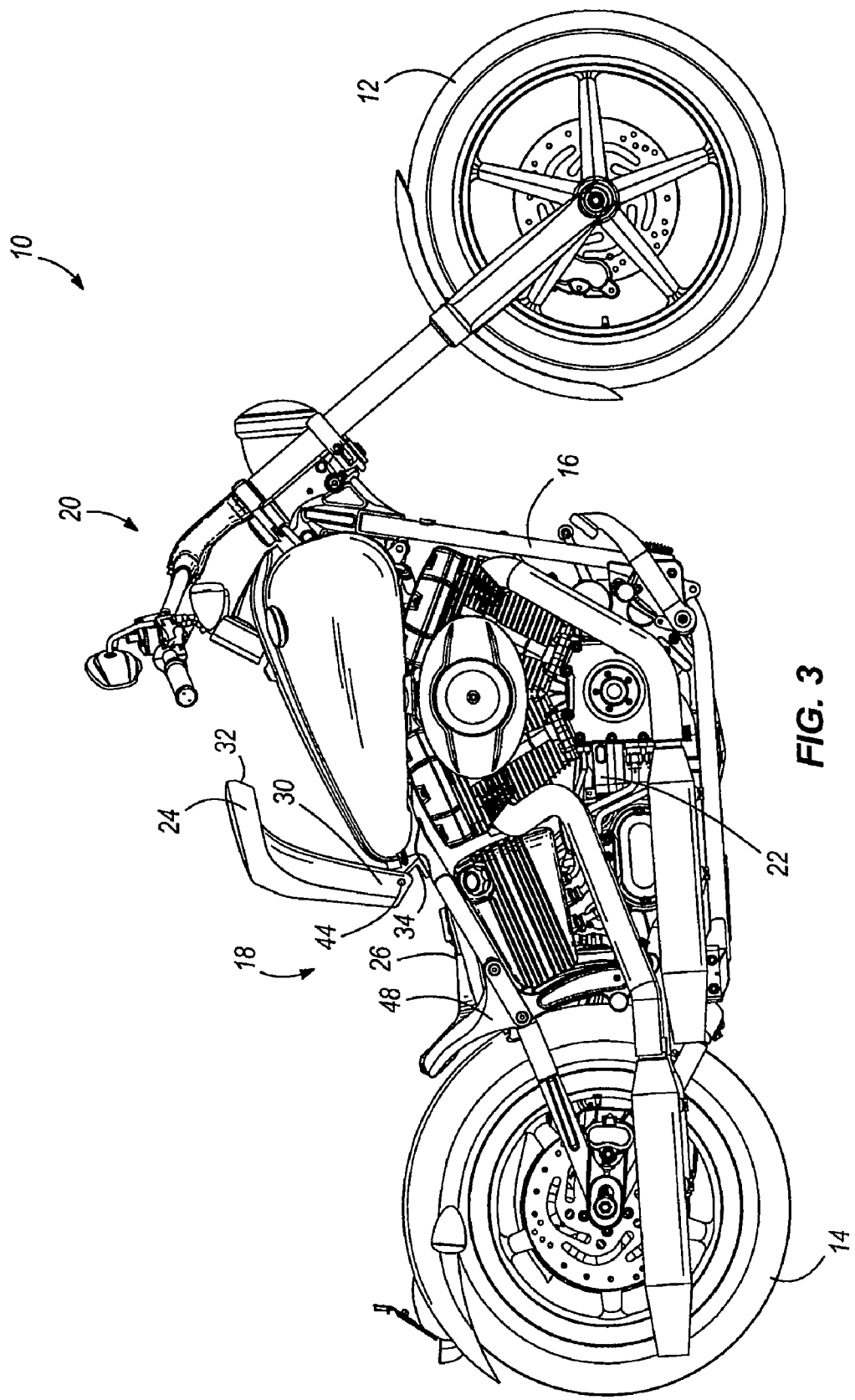
FIG. 3 is a side view of the motorcycle of FIG. 1 with a rider seat raised to access a rear seat.

The rider seat 24 has a forward end 30 closer to the front wheel 12 and a rearward end 32 closer to the rear wheel 14. The forward end 30 of the rider seat 24 is pivotally coupled to the frame 16 with a pivoting bracket 34. As shown in FIG. 3, the rider seat 24 can be pivoted relative to the frame 16 to raise the rearward end 32 away from the motorcycle frame 16. In the illustrated construction, the rearward end 32 of the rider seat 24 is not fastened or otherwise mechanically secured to the frame 16 to inhibit such pivoting. Thus, the rearward end 32 of the rider seat 24 can be flipped-up or pivoted upwardly by merely lifting the rearward end 32 up. In other constructions, however, the rearward end 32 of the rider seat 24 can be detachably coupled to the frame 16. Fasteners, latches, and/or locks, etc., can be provided for detachably coupling the rearward end 32 of the rider seat 24 to the frame 16.

Figure 4:
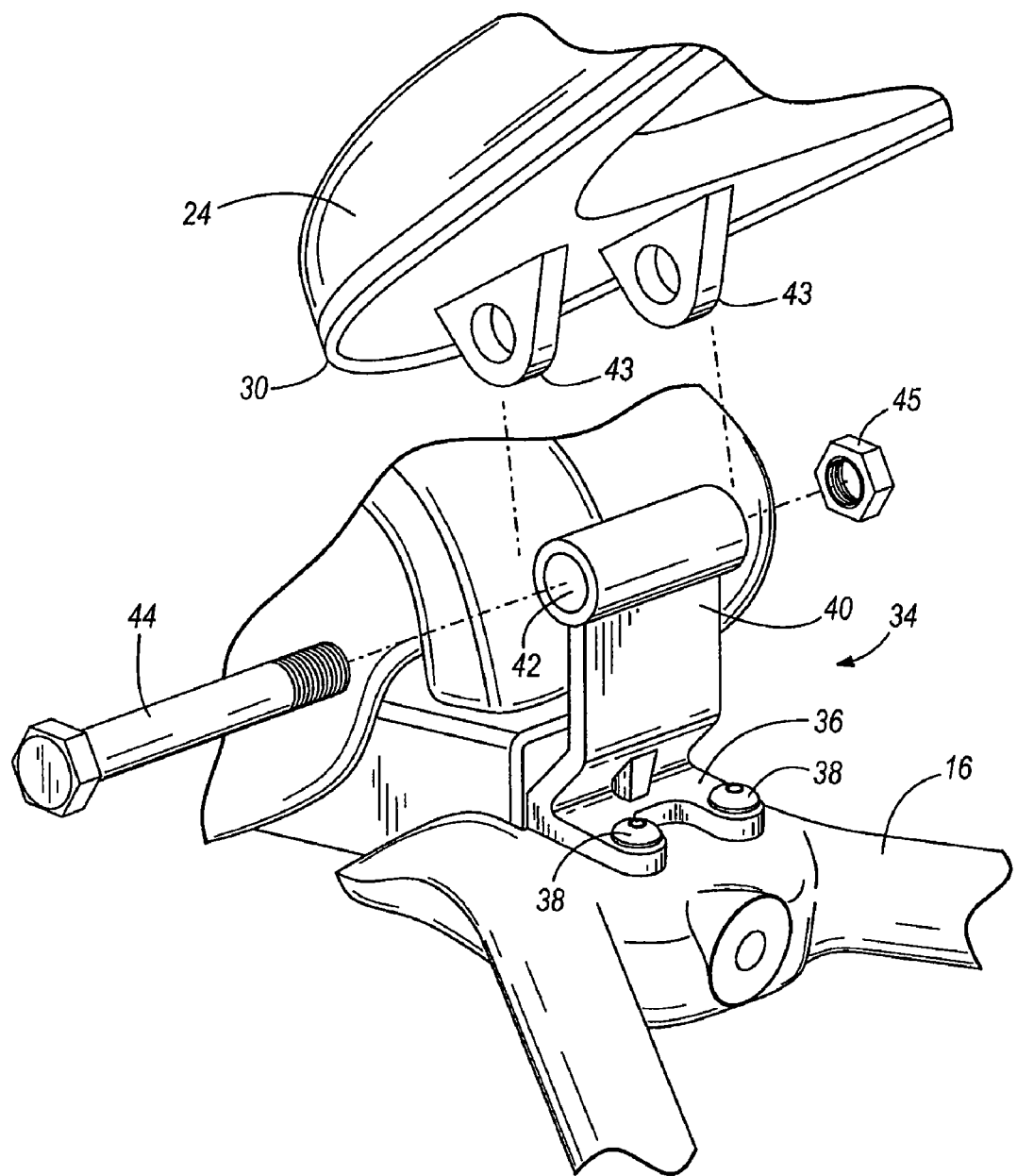
FIG. 4 is a perspective view of a rider seat mounting bracket in relation to a frame of the motorcycle.

FIG. 4 shows the pivoting bracket 34 in more detail. The pivoting bracket 34 has a first or mounting portion 36 with apertures for receiving fasteners 38 for securing the pivoting bracket 34 to the motorcycle frame 16. A second or hinge portion 40 depends upwardly from the mounting portion 36 and defines a cylindrical bore 42. The rider seat 24 includes a pair of spaced apart brackets 43 at the forward end 30. A pin 44 (see FIG. 3) extends through the aligned brackets 43 and bore 42 and is secured with a nut 45 to pivotally couple the rider seat 24 to the mounting bracket 34. The rider seat 24 is pivotal about the pin 44 relative to the frame 16 to raise and lower the rearward end 32 of the rider seat 24. In other constructions, the rider seat 24 is pivotably mounted to the frame 16 so as to open sideways, rather than forwardly, is detachably coupled to the frame 16, or is otherwise movable relative to the frame 16 to access the rear seat assembly 26.

Figure 5:
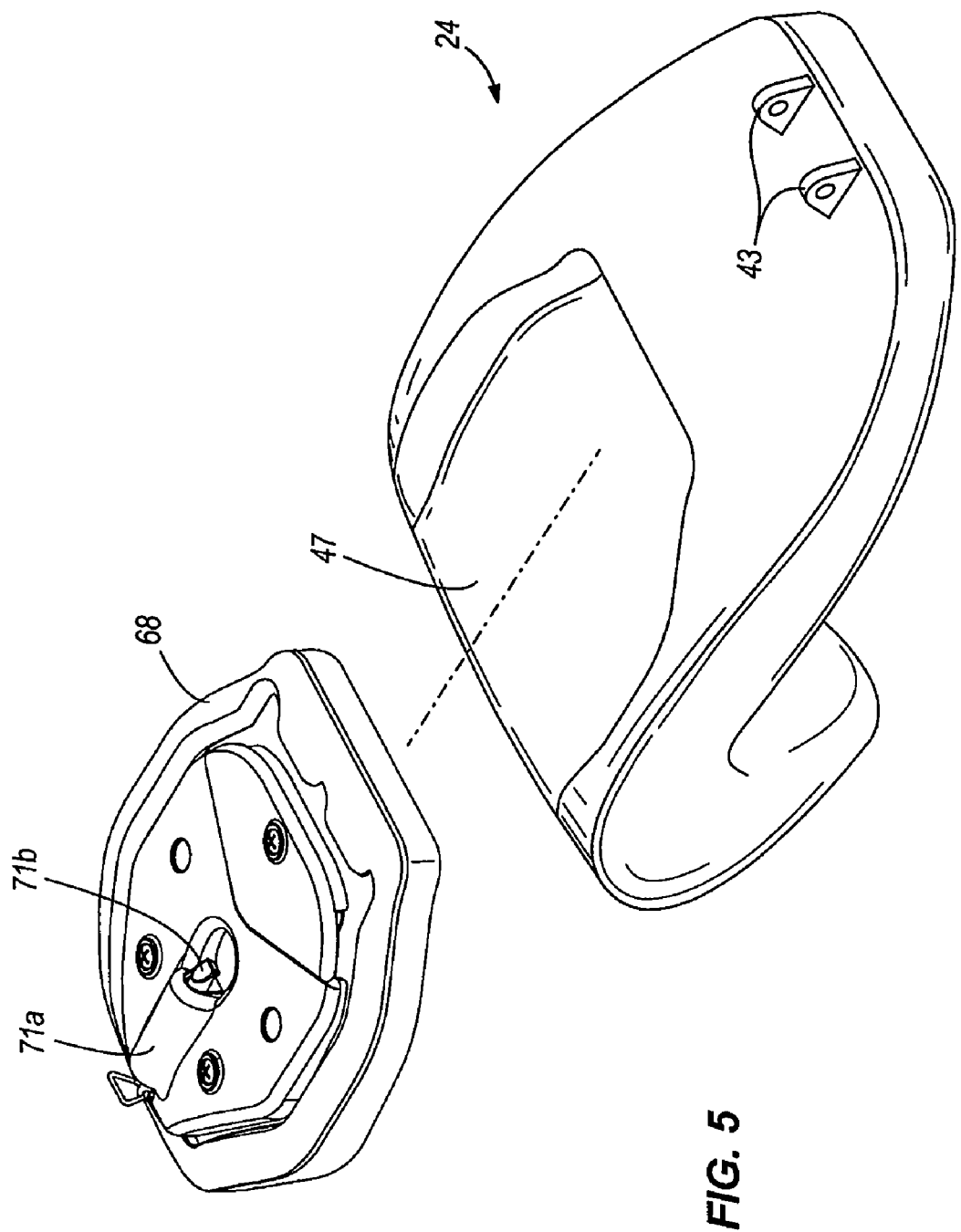
FIG. 5 is a perspective view of an underside of the rear seat and rider seat of FIG. 3.

The rider seat 24, as shown in FIG. 5, includes a storage area 47 on an underside for storing a rear seat 68 when not in use. The storage area 47 is a pocket that the rear seat 68 can slide into and out.

Figure 6:
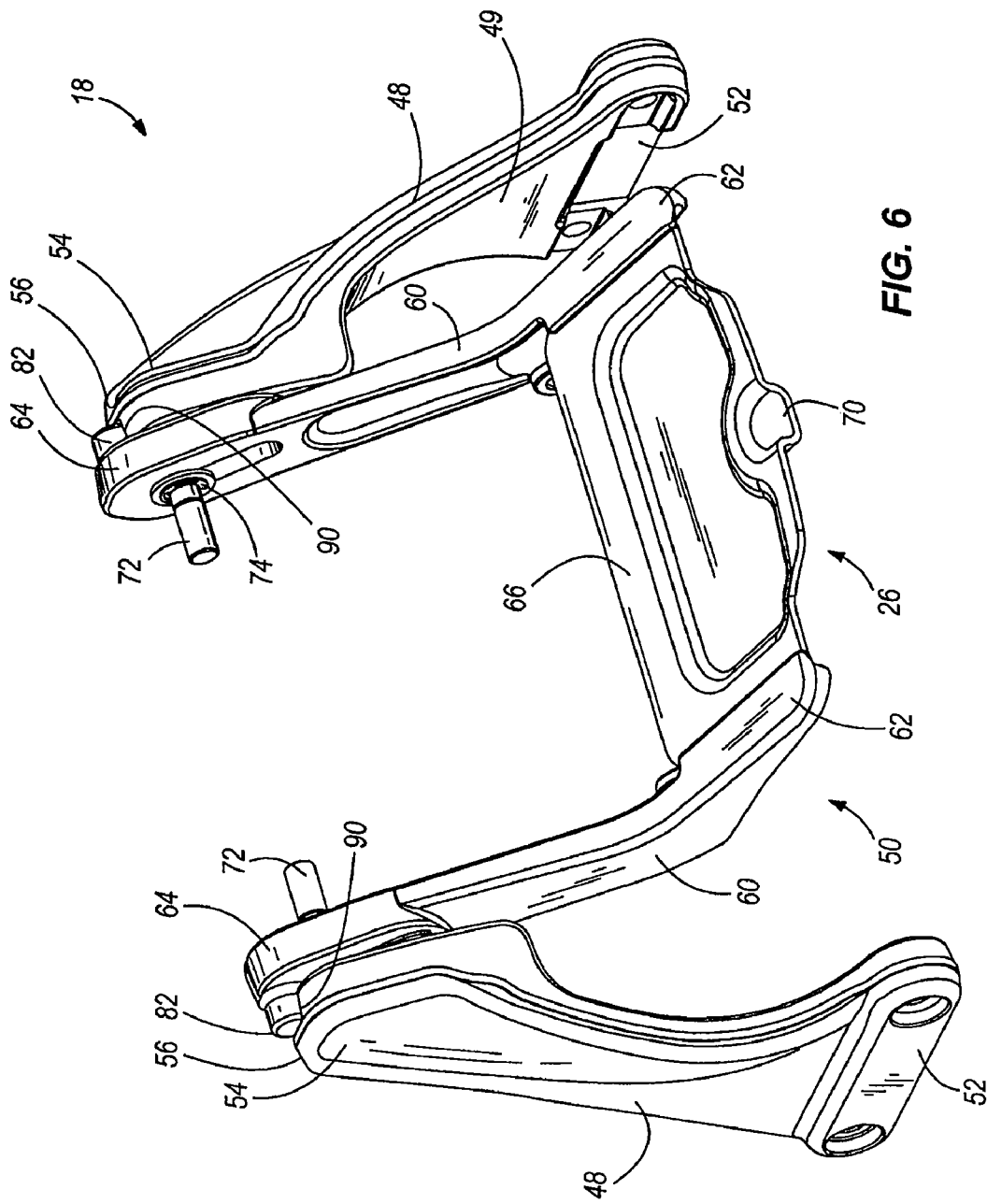
FIG. 6 is a front perspective view of a rear seating assembly with a lateral support removed and the rear seat in a stored position.
Figure 7:
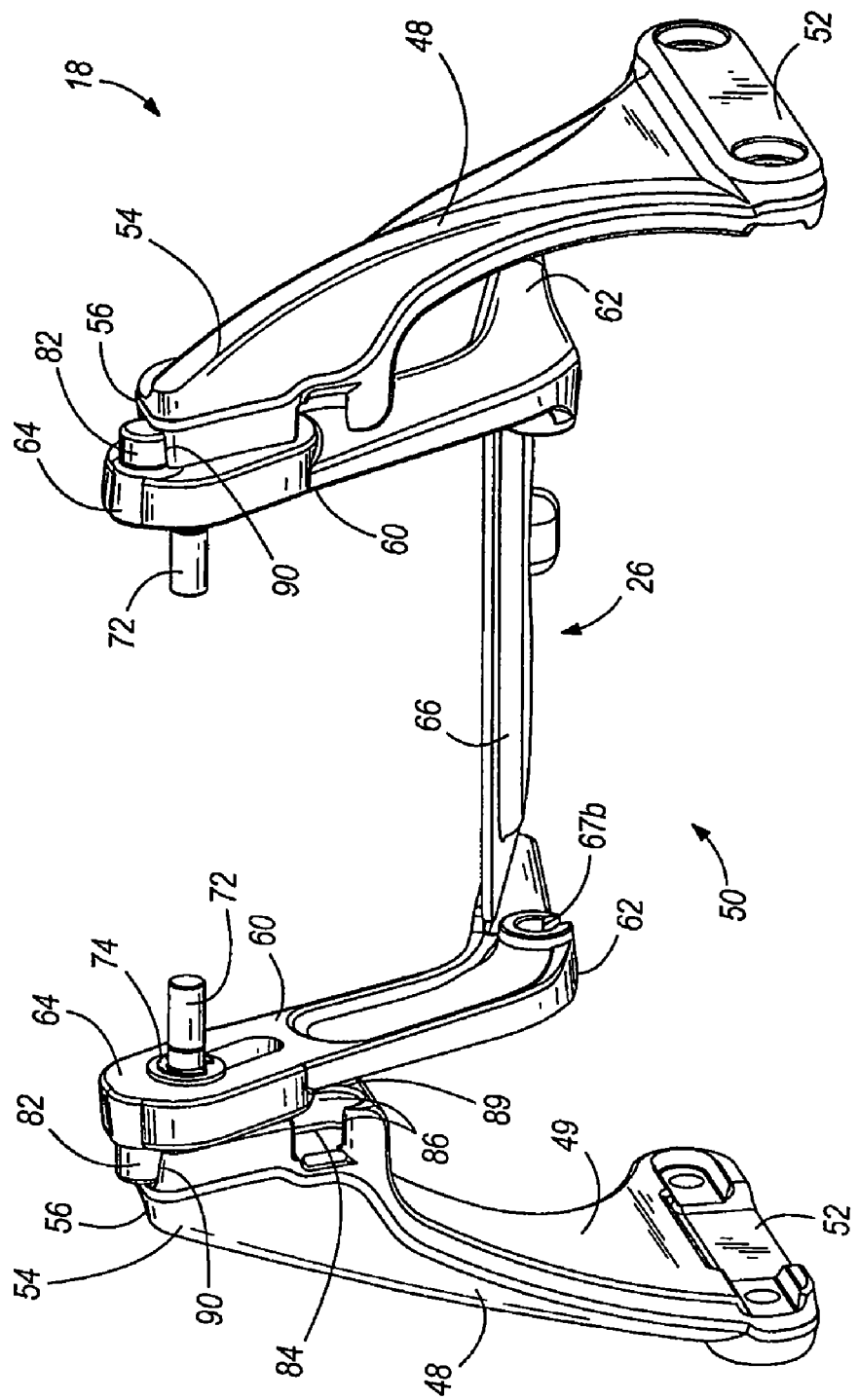
FIG. 7 is a rear perspective view of the rear seating assembly of FIG. 6.
Figure 8:
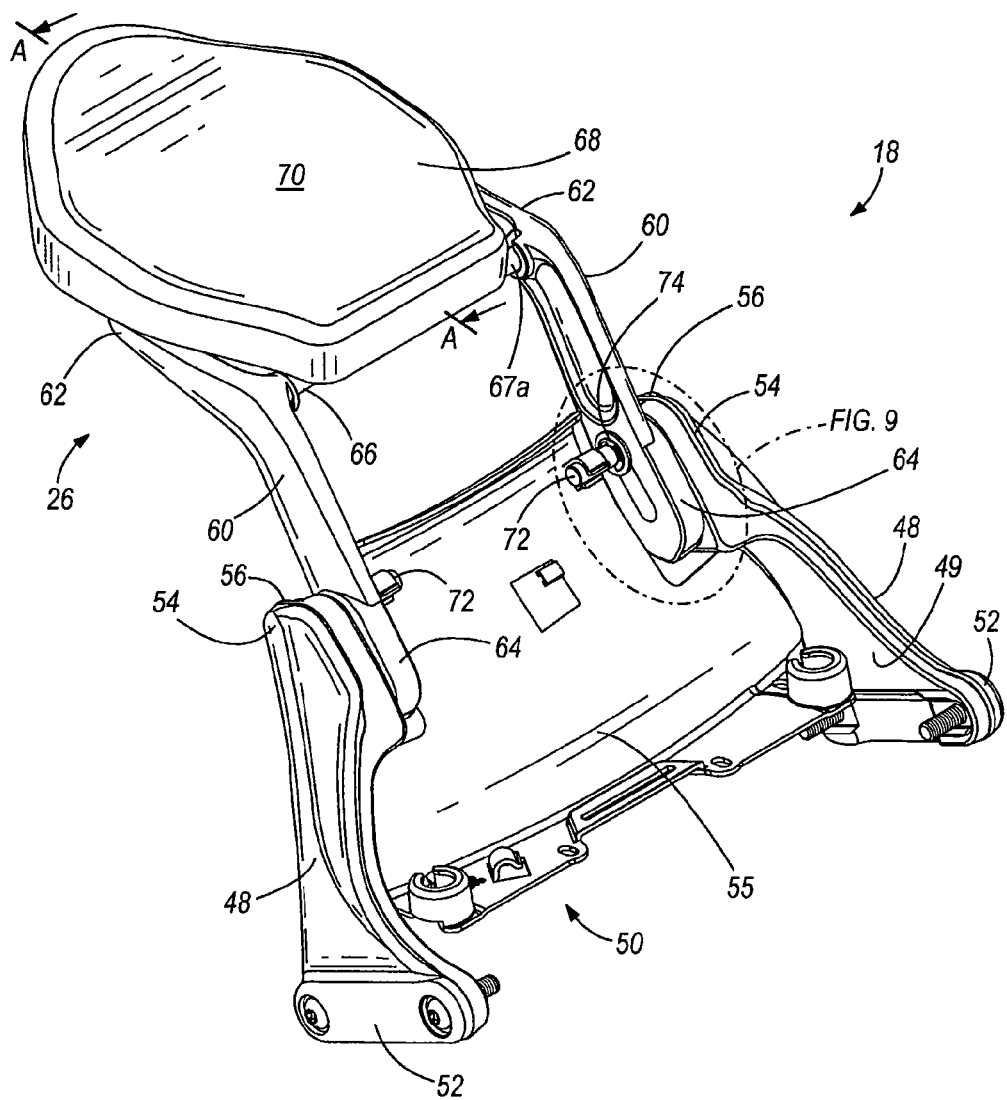
FIG. 8 is a front perspective view of the rear seating assembly of FIG. 6 including the lateral support and the rear seat in a usage position.
Figure 9:
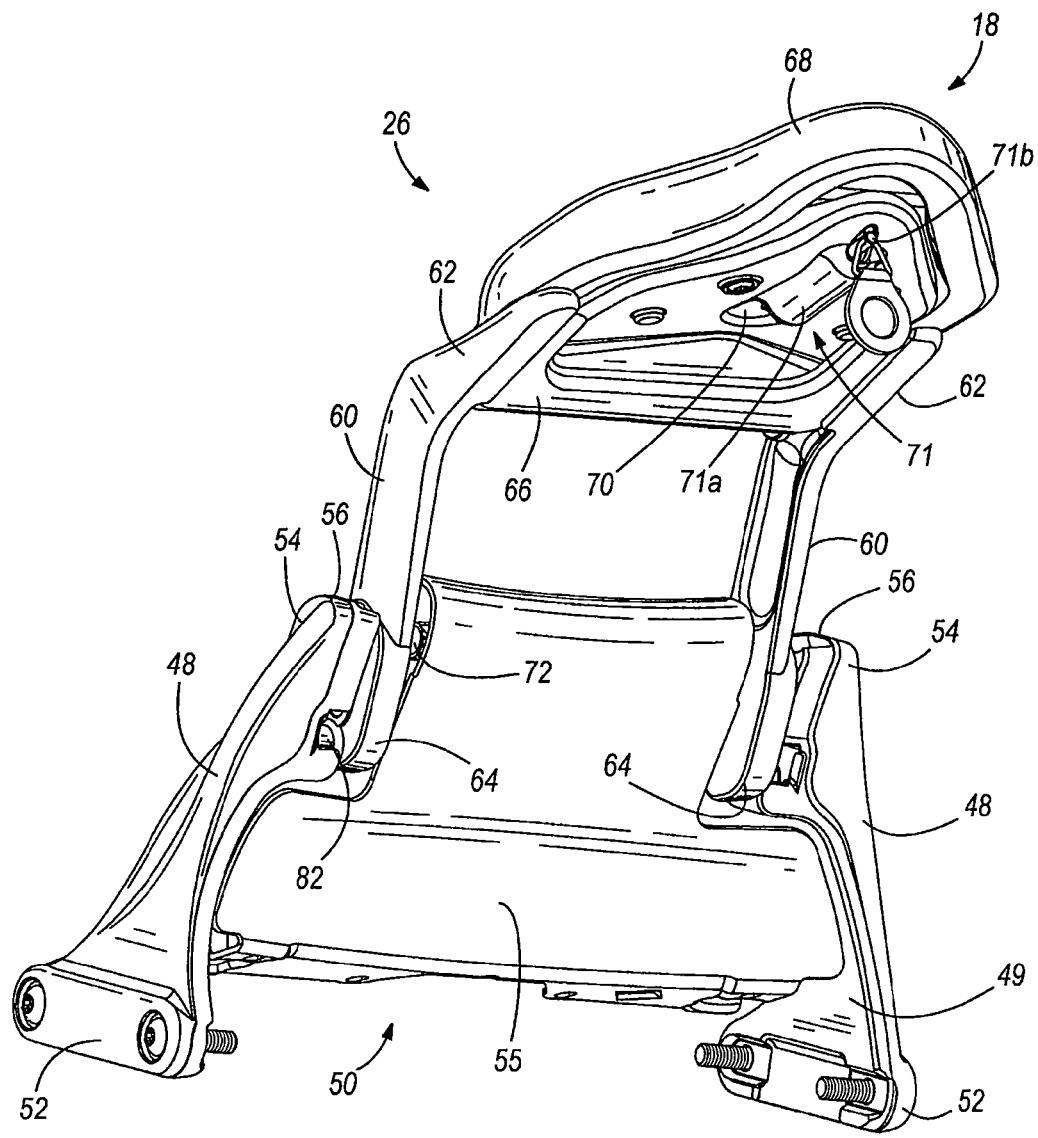
FIG. 9 is a rear perspective view of the seating assembly of FIG. 8.
Figure 10:
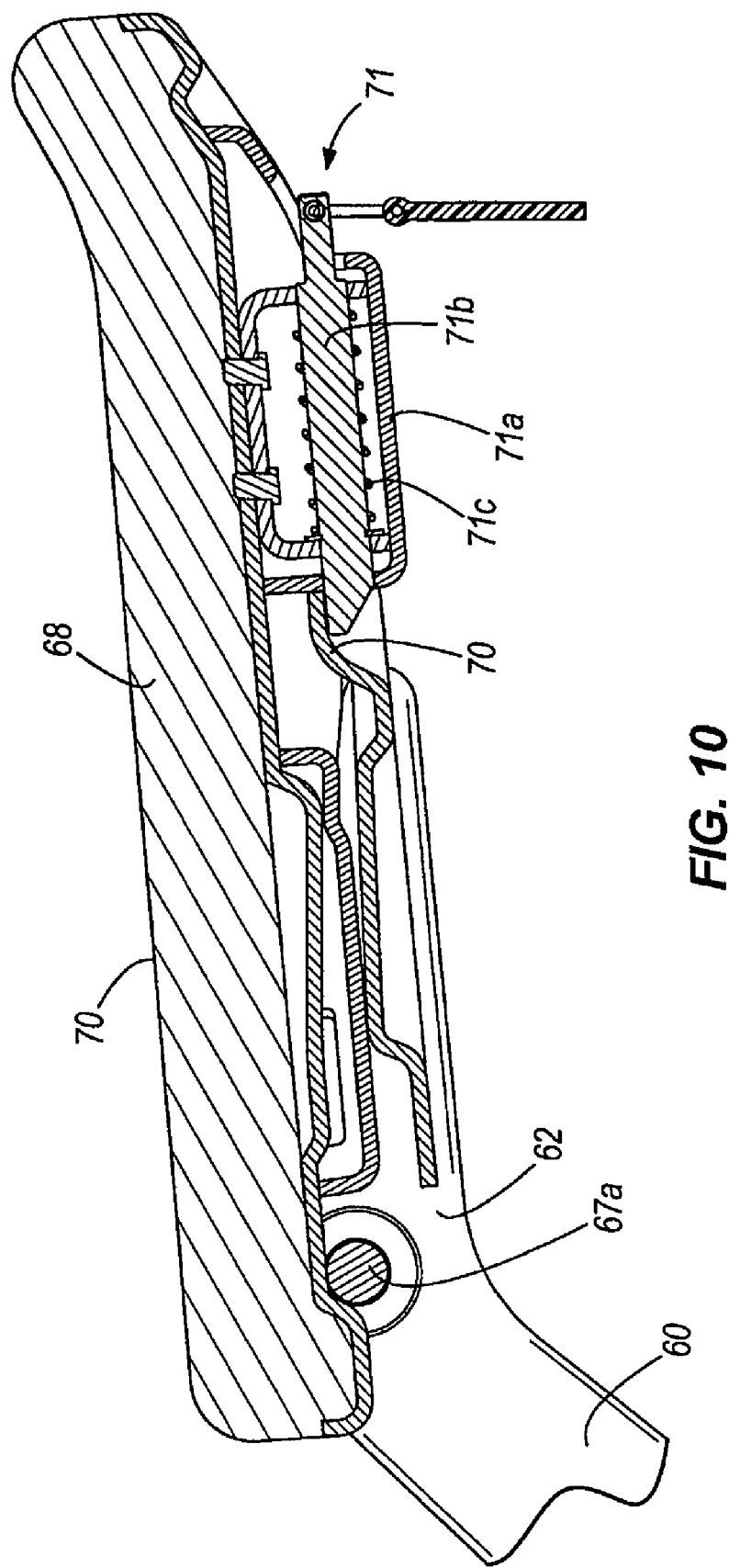
FIG. 10 is a cross-sectional view of the rear seat of FIG. 2 taken along line A-A.

FIGS. 6 and 7 illustrate the rear seat assembly 26 in more detail. The rear seat assembly 26 includes a pair of opposed support arms 48 positioned at the rearward end 32 of the rider seat 24 (see FIG. 3) on either side of the motorcycle frame 16. Each support arm 48 has an inward facing surface 49, a first end portion 52 that is mounted to the motorcycle frame 16, and a second end portion 54 extending upwardly from the first end portion 52. As shown in FIGS. 7 and 8, a lateral support 55 is coupled to and joins the support arms 48. Upper ends 56 of the support arms 48 are approximately aligned with a top of the rearward end 32 of the rider seat 24. When the rider seat 24 is in the downward or normal use position, the upper ends 56 do not extend above the rearward end 32 of the rider seat 24 (see FIGS. 1 and 2).

Returning to FIGS. 6 and 7, the rear seat assembly 26 further includes a pair of spaced apart rear seat supports 60 each having a first end portion 62 and a second end portion 64. In the illustrated construction, the second end portion 64 is angled relative to the first end portion 62. A cross-support 66 is coupled to and joins the first end portions 62.

As shown in FIGS. 5, 7, 9 and 10, a rear seat 68 is mounted to the cross-support 66. In the illustrated construction, the rear seat 68 is detachably mounted to the cross-support 66. The rear seat 68 includes a pair of protrusions 67a at a forward end for being received in a corresponding recesses 67b on the cross-support 66. A coupling feature on the rear seat 68 is provided for locking the rear seat 68 to the cross-support 66. The coupling feature is a wedge-shaped protrusion 70 on the cross-support 66 that is captured by a capturing feature 71 on the rear seat 68. The capturing feature 71 includes a bore 71a, a key 71b slidably positioned within the bore 71a, and a biasing member 71c.

The second end portions 64 of the rear seat supports 60 are movably coupled to the second end portions 54 of the support arms 48. In the illustrated construction, the second end portions 64 are pivotally coupled to the support arms 48. In other constructions, the rear seat supports 60 are slidably coupled to the frame 16, are detachable from the frame 16, or are otherwise movably coupled to the frame 16 for moving from the stowed position to the usage position. The rear seat supports 60 are cantilevered rearwardly and upwardly of the support arms 48 so that the rear seat 68 is positioned over the rear wheel 14 (see FIG. 2).

Figure 11:
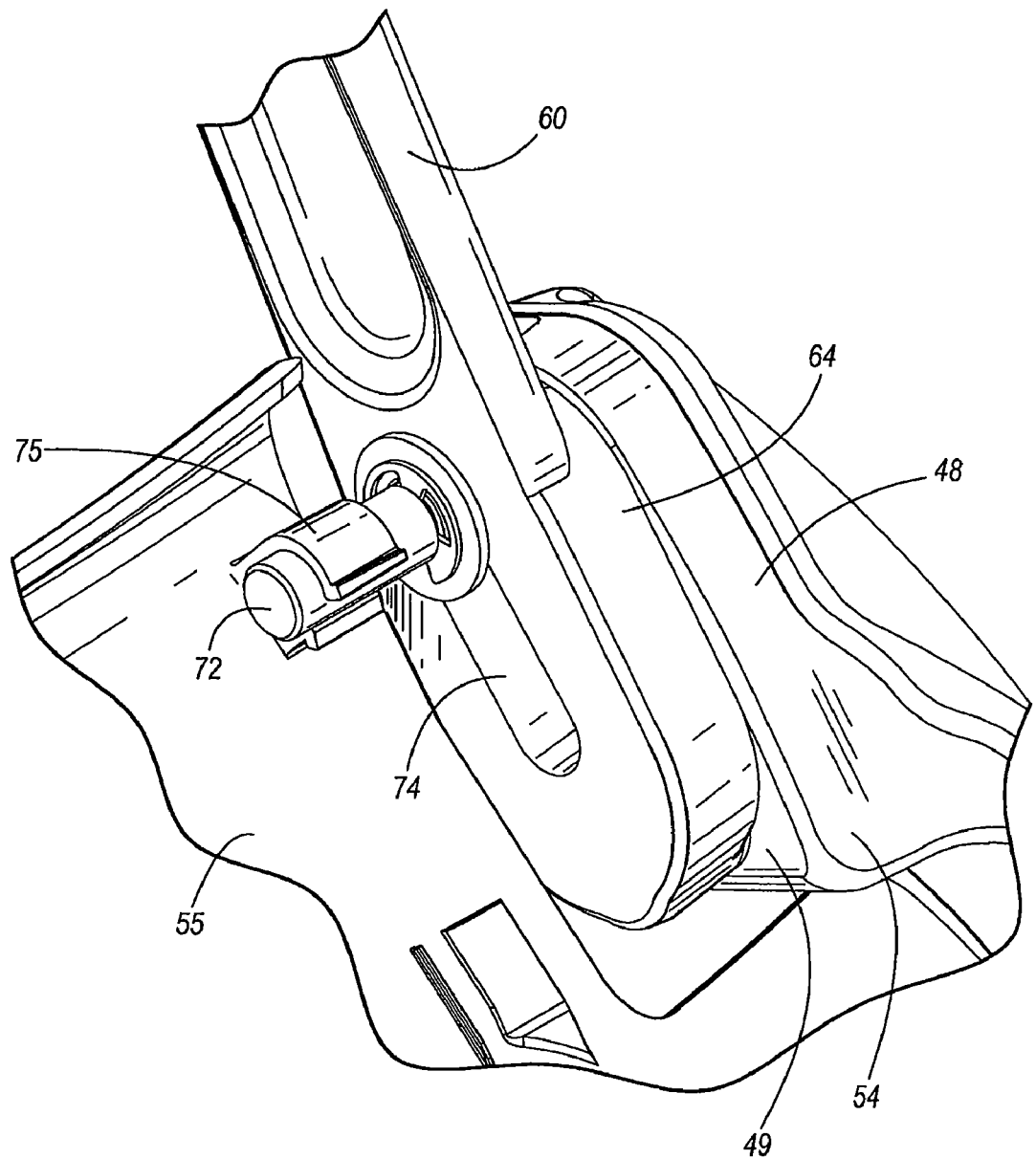
FIG. 11 is an enlarged view of a lock arrangement of FIG. 8.

As best shown in FIG. 11, the support arms 48 have inwardly projecting pins 72 on the inner surfaces 49 that are received in corresponding apertures 74 in the second end portions 64 of the rear seat supports 60. The pins 72 are supported by a capture member 75 depending from the lateral support 55. The capture member 75 prevents the rear seat supports 60 from being displaced inwardly and disengaging from the pins 72. The apertures 74 are elongated so that the rear seat supports 60 can slide axially relative to the pins 72 as well as pivot about the pins 72. In other constructions, the pins 72 are on the rear seat supports 60 and the apertures 74 are in the support arms 48.

The seating assembly 18 further includes a stop feature for supporting the rear seat assembly 26 relative to the frame 16 in the usage position. The stop feature includes a stop protrusion 82 that protrudes outwardly from the rear seat supports 60 towards the support arms 48 and a corresponding stop groove or recess 84 on the inward facing surface 49 of the support arms 48. In other constructions, the stop protrusion 82 is formed on the support arms 48 and the stop recess 84 is formed on the rear seat supports 60.

The illustrated stop protrusion 82 is a cylindrical plug. In other constructions, the stop protrusion 82 can have other configurations, including, for example, a pin, a hook, an arrow, etc. The stop recess 84 is shaped to receive the stop protrusion 82 and can interlock with the stop protrusion depending upon the geometry of the stop protrusion 82. In the illustrated construction, best shown in FIG. 7, the stop recess 84 is formed between walls 86 that project inwardly from the inner surface 49 of the support arms 48. The stop recess 84 is much shorter than the path of travel of the stop protrusion 82 so that the walls 86 forms a shoulder rather than an elongated groove in the support arm 48. The stop recess 84 can be contoured to accommodate all or a portion of the arcuate path of the stop protrusion 82 as the rear seat support 60 pivots about the pins 72.

The stop feature functions as a mechanical stop to limit pivotal movement of the rear seat supports 60. That is, the stop protrusion 82 bottoms out against the stop wall 86 inhibiting further pivoting of the rear seat assembly 26. The stop protrusion 82 thus engages the walls 86 of the stop recess 84 to support the rear seat assembly 26 in the usage position.

The seating assembly 18 further includes a lock feature that prevents the rear seat assembly 26 from inadvertently pivoting forwardly towards the stowed position. The lock feature is a slot 89 extending downwardly from the stop recess 84, as shown in FIG. 7. When the rear seat assembly 26 approaches the usage position, the stop protrusion 82 slides within the stop recess 84 downwardly into the slot 89. The rear seat assembly 26 moves slightly downwardly which is accommodated by the elongated apertures 74 sliding over the pins 72. The stop protrusions 82 are captured within the slot 89 and are prevented from exiting the slot 89 unless the rear seat assembly 26 is slid upwardly. The force of gravity on the rear seat assembly 26 retains the stop protrusions 82 in the slot 89. Thus, the rear seat assembly 26 is prevented from pivoting forwardly out of the usage position without first being slid manually upwardly a sufficient distance to move the stop protrusion 82 out of the slot 89.

The support arms 48 each include a cup 90 at the upward ends 56. The stop protrusion 82 resides within the cup 90 when the rear seat assembly 26 is in the stowed position, as shown in FIGS. 6 and 7. The cup 90 forms a secondary lock feature which prevents the rear seat assembly 26 from pivoting rearwardly into the usage position unless the rear seat assembly 26 is slid upwardly.

During normal use, shown in FIG. 1, the rear seat assembly 26 is positioned in the storage area 47 below the rider seat 24 in the stowed position. The rear seat assembly 26, including the rear seat supports 60 and the rear seat 68, are concealed from view when the rear seat assembly 26 is in the stowed position. The rear end 32 of the rider seat 24 abuts the support arms 48 and partially conceals the support arms 48. The motorcycle 10 is therefore configured as a single rider vehicle for supporting a single rider on the rider seat 24. In addition to being configured for use by a single rider, the motorcycle 10 gives the appearance that the motorcycle 10 is a single-rider vehicle. That is, the components of the rear seat assembly 26 are hidden from view, so that it is not apparent that the motorcycle 10 can also function as a dual rider vehicle.

If it is desired to configure the motorcycle 10 for dual riding, the rear seat assembly 26 is moved into the usage position on the motorcycle 10. To move the rear seat assembly 26 to the usage position, the rider seat 24 is pivoted about the mounting bracket pin 44, elevating the rearward end 32 and to access the storage area 47 (see FIG. 3).

Figure 15:
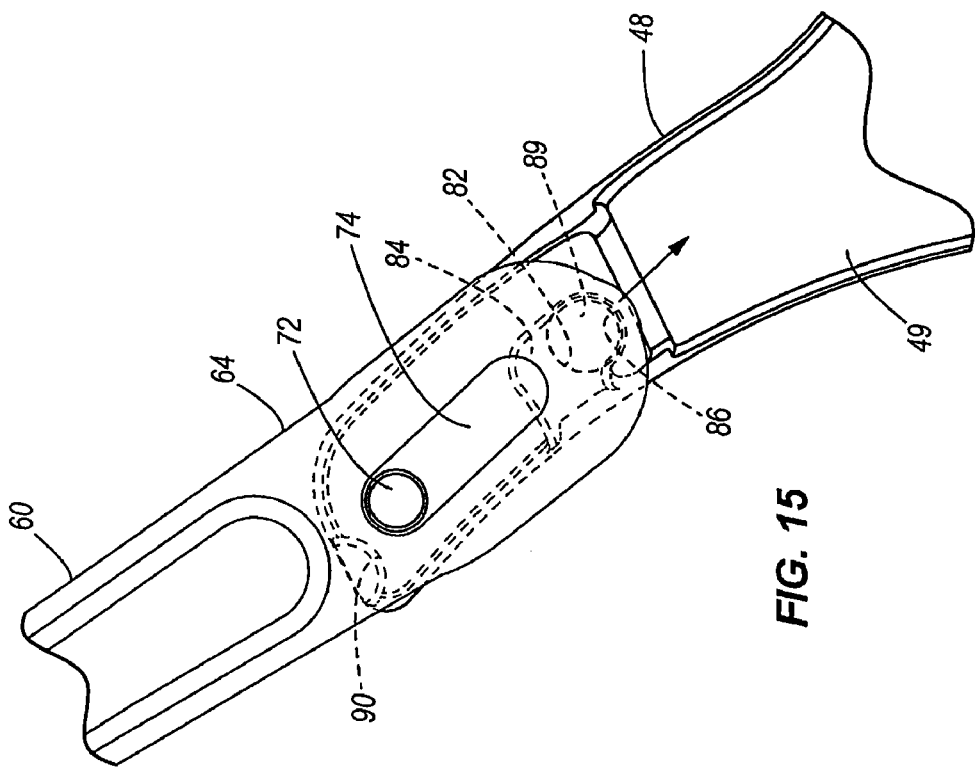
FIG. 15 is a side view of the rear seat support of FIG. 14 slid downwardly into the usage position.
Figure 14:
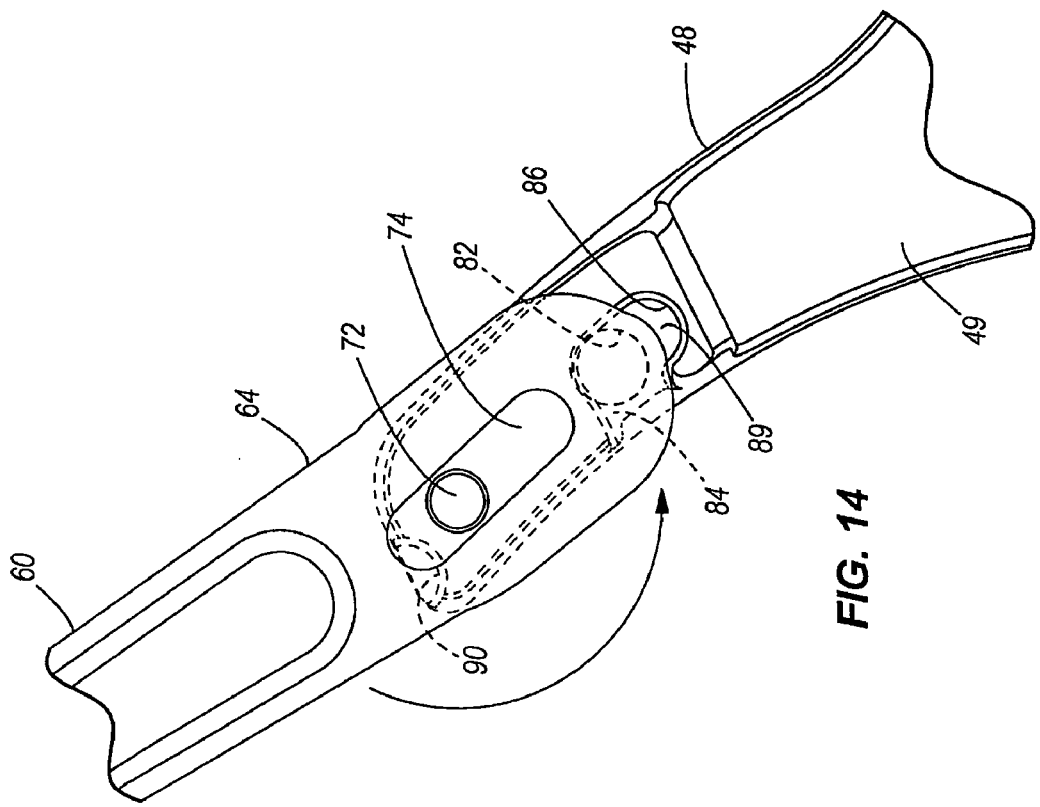
FIG. 14 is a side view of the rear seat support of FIG. 13 pivoted rearwardly.

FIG. 12 illustrates the support arm 60 in the storage position. The rear seat supports 60 are slid upwardly as shown in FIG. 13 to dislodge the stop protrusions 82 from the cups 90. The rear seat supports 60 are pivoted about the pins 72 towards the rear of the motorcycle 10 as shown in FIG. 14. As the rear seat supports 60 pivot rearwardly, the stop protrusions 82 enter the stop recesses 84. The rear seat supports 60 then slide downwardly so that the apertures 74 travel over the pins 72 and the stop protrusions 82 are captured within the slots 89 and bottom out against the walls 86 (see FIG. 15). This inhibits pivoting of the rear seat assembly 26 forwardly and rearwardly.

To mount the rear seat 68 to the cross-support 66, the forward protrusions 67a are inserted into the recesses 67b and the rear seat 68 pivoted downwardly about the protrusions 67a to rest on the cross-support 66 so that the protrusion 70 and the bore 71a are approximately aligned with one another. The key 71b is pulled rearwardly against the spring force of the biasing member 71c so that the key 71b clears the protrusion 70. This allows the protrusion 70 and the bore 71a to be fully aligned with one another. The key 71b is released and slides forwardly under the force of the biasing member 71c to protrude from the bore 71a and engage the protrusion 70, thereby locking the rear seat 68 to the cross-support 66. In other constructions, the rear seat 68 is permanently attached to the cross-support 66.

In the usage position, shown in FIGS. 2, 8, 9 and 15, the rear seat supports 60 are supported on the support arms 48 at the pivoting pins 72 and also by the stop protrusion 82 butting up against the walls 86. The rear seat 68 is facing upwardly and is cantilevered rearward of the rider seat 24. To complete transformation of the motorcycle 10 from a single rider configuration to a dual rider configuration, the rider seat 24 is pivoted downwardly back into the normal use configuration. The rearward end 32 of the rider seat 24 overlays the support arms 48 as well as the first end portions 62 of the rear seat supports 60 (see FIG. 2). The rider seat 24 blocks forward pivoting of the rear seat assembly 26 back towards the stowed position. This prevents the rear seat assembly 26 from inadvertently pivoting out of the usage position.

To transform the motorcycle 10 from a dual rider configuration to a single rider configuration, the steps discussed above are reversed. That is, the rider seat 24 is pivoted upwardly about the bracket pin 44 to raise the rearward end 32. The rear seat 68 is detached from the cross-support 66 by sliding the key 71b rearwardly to disengage from the protrusion 70. The rear-seat 68 is then lifted off of the cross-support 66 and inserted into the storage area 47. The rear seat supports 60 are slid upwardly to remove the stop protrusions 82 from the slots 89 and the rear seat supports 60 are pivoted forwardly from the usage position. The rear seat supports 60 are then slid downward so that the protrusions 82 engage the cups 90. With the rear seat assembly 26 in the stowed position, the rider seat 24 is pivoted downwardly about the bracket pin 44 to once again cover the rear seat assembly 26.

Thus, the invention provides, among other things, a seat assembly for a motorcycle including an optional passenger seat. Various features and advantages of the invention are set forth in the following claims.

What is claimed is:

1. A seat assembly for a motorcycle, the seat assembly comprising:
   a rider seat having a forward end and a rearward end;
   a support arm located rearward of the rider seat;
   a rear seat support having a first end portion and a second end portion, the first end portion being movably coupled to the support arm and the second end portion supporting a rear seat, the rear seat support being pivotable from a first position in which the rear seat is stowed below the rider seat to a second position in which the rear seat is located rearward of the rider seat for supporting a passenger; and
   a stop feature for supporting the rear seat support relative to the support arm, the stop feature including a stop protrusion depending from one of the support arm and the first end portion and a stop recess formed in the other of the support arm and the first end portion, wherein the stop protrusion bottoms out against a wall defining the stop recess when the rear seat is in the second position.

2. The seat assembly of claim 1, further comprising a rider seat bracket, wherein the rider seat is movably coupled to the bracket.

3. The seat assembly of claim 1, wherein the rear seat support is concealed by the rider seat when in the first position.

4. The seat assembly of claim 1, wherein the rear seat is detachably coupled to the rear seat support.

5. The seat assembly of claim 4, wherein the rider seat includes a pocket for receiving the detached rear seat.

6. The seat assembly of claim 1, wherein the first end portion is pivotably coupled to the support arm.

7. The seat assembly of claim 1, further comprising a lock feature on one of the support arm and the rear seat support for inhibiting movement of the rear seat support relative to the support arm.

8. The seat assembly of claim 7, wherein the lock feature comprises a slot extending downwardly from the stop recess.

9. The seat assembly of claim 8, wherein the rear seat support is slidable axially relative to the support arm to seat the stop protrusion in the slot.

10. A motorcycle comprising:
    a pair of wheels:
    a frame supported on the wheels for movement;
    a rider seat coupled to the frame; and
    a rear seat assembly including,
       a support arm coupled to the frame,
       a rear seat support having a first end portion coupled to the support arm and a second end portion supporting a rear seat, the rear seat support being pivotable from a first position in which the rear seat is stowed below the rider seat to a second position in which the rear seat is located rearward of the rider seat for supporting a passenger, and a stop feature for supporting the rear seat support relative to the support arm, the stop feature including a stop protrusion depending from one of the support arm and the first end portion and a stop recess formed in the other of the support arm and the first end portion, wherein the stop protrusion bottoms out against a wall defining the stop recess when the rear seat is in the second position.

11. The motorcycle of claim 10, further comprising a lock feature on one of the support arm and the rear seat support for inhibiting pivoting of the rear seat support relative to the support arm.

12. The motorcycle of claim 11, wherein the lock feature comprises a slot extending downwardly from the stop recess.

13. The motorcycle of claim 12, wherein the rear seat support is slidable axially relative to the frame to seat the stop protrusion in the slot.

14. The motorcycle of claim 10, wherein the rider seat is movably coupled to the frame.

15. The motorcycle of claim 10, wherein the rear seat assembly is concealed by the rider seat when in the first position.

16. The motorcycle of claim 10, wherein the rear seat is detachably coupled to the rear seat support.

17. The motorcycle of claim 16, wherein the rider seat includes a pocket for receiving the detached rear seat.

18. The motorcycle of claim 10, wherein the first end portion is pivotably coupled to the support arm.

* * * * *